United States Patent [19]
Jacques et al.

[11] 3,975,768
[45] Aug. 17, 1976

[54] REMOVABLE CARTRIDGE FLEXIBLE DISC MEMORY APPARATUS

[75] Inventors: James O. Jacques; Barry C. Kockler, both of Longmont; Frank M. Weller, Jr., Boulder, all of Colo.

[73] Assignee: Genisco Technology Corporation, Compton, Calif.

[22] Filed: June 20, 1973

[21] Appl. No.: 371,859

[52] U.S. Cl. .................................. 360/99; 360/133
[51] Int. Cl.² ................... G11B 5/016; G11B 23/04
[58] Field of Search ................ 360/99, 97, 86, 133, 360/121, 123

[56] References Cited
UNITED STATES PATENTS

| | | | |
|---|---|---|---|
| 3,303,485 | 2/1967 | Lee | 360/99 |
| 3,304,544 | 2/1967 | Johnson | 360/133 |
| 3,416,150 | 12/1968 | Lindberg | 360/133 |
| 3,419,888 | 12/1968 | Levy | 346/74 EB |
| 3,526,884 | 9/1970 | Buslik | 360/133 |
| 3,678,481 | 7/1972 | Dalziel | 360/99 |
| 3,770,908 | 11/1973 | Craggs | 360/133 |
| 3,800,325 | 3/1974 | O'Brien | 360/133 |
| 3,812,534 | 5/1974 | Rousseau | 360/133 |
| 3,815,150 | 6/1974 | Stoddard | 360/133 |

Primary Examiner—Bernard Konick
Assistant Examiner—Jay P. Lucas
Attorney, Agent, or Firm—Blakely, Sokoloff, Taylor & Zafman

[57] ABSTRACT

Flexible disc memory apparatus has a drive for rotating the flexible disc in a cartridge which is opened when inserted into the apparatus by a wedge shaped member inserted into the cartridge. The drive includes a magnetic coupling and centering device for the hub of the flexible disc. A movable head plate carries transducer heads which are positioned at selected track locations by the head. The apparatus also includes a second flexible disc and head plate integrally incorporated in the apparatus.

21 Claims, 11 Drawing Figures

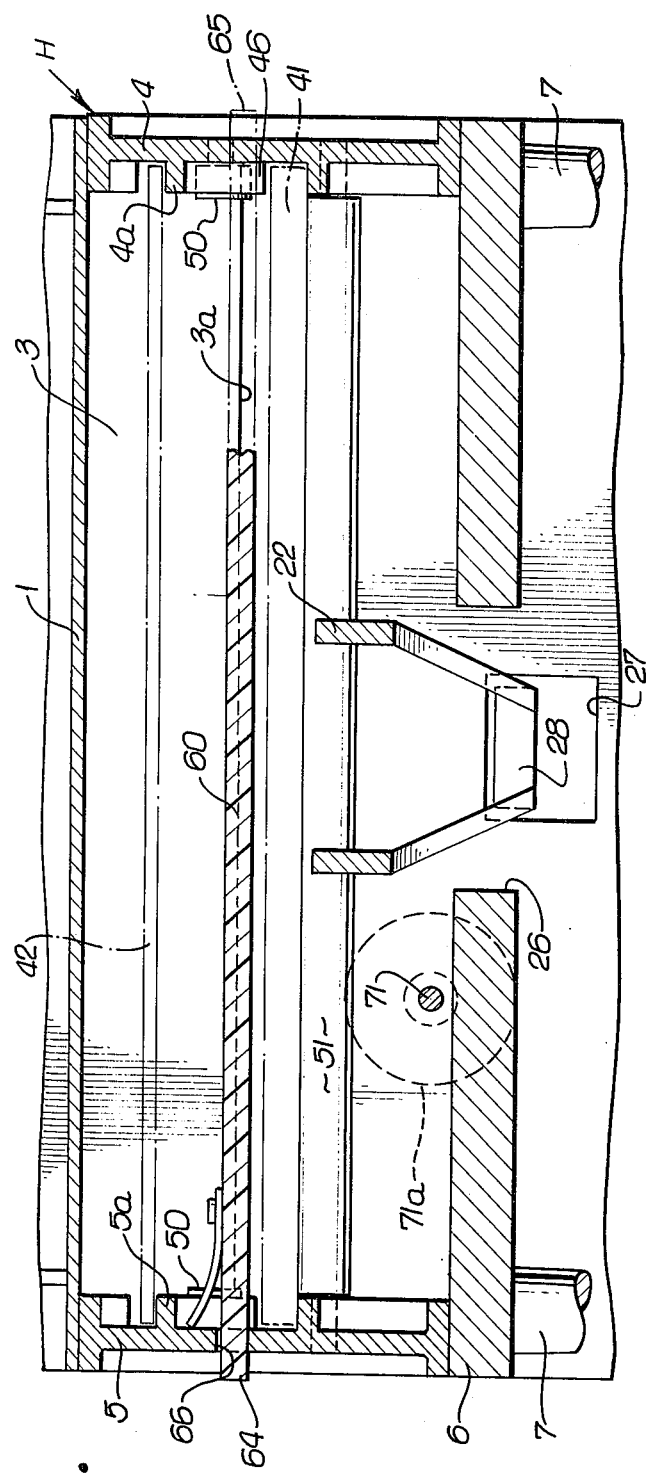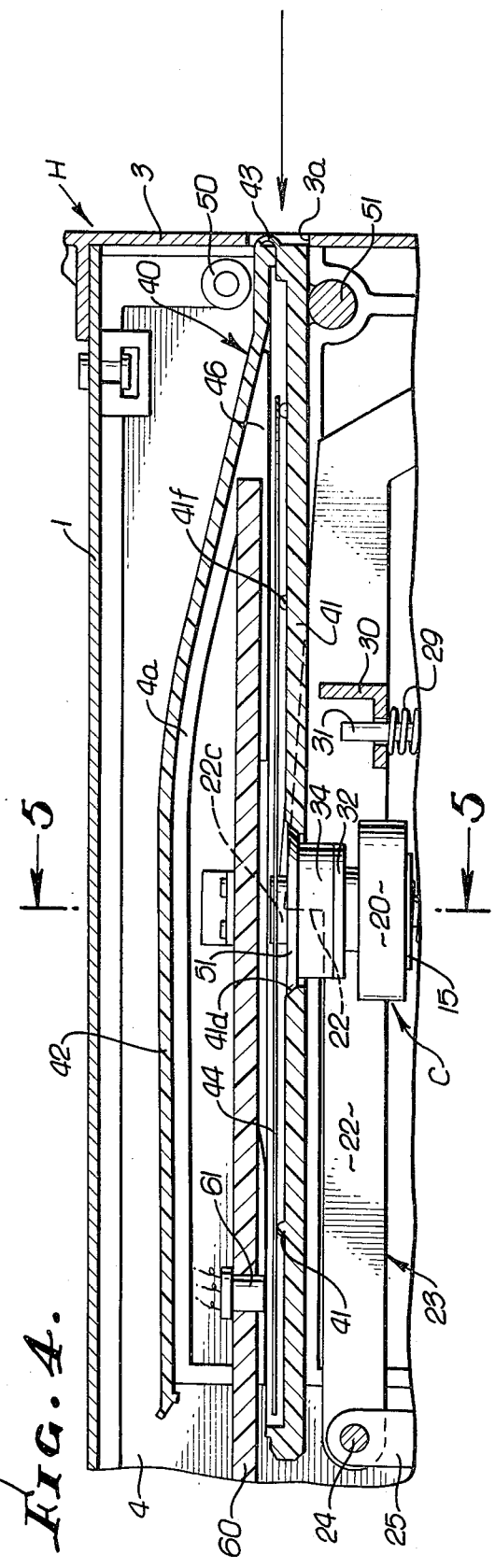

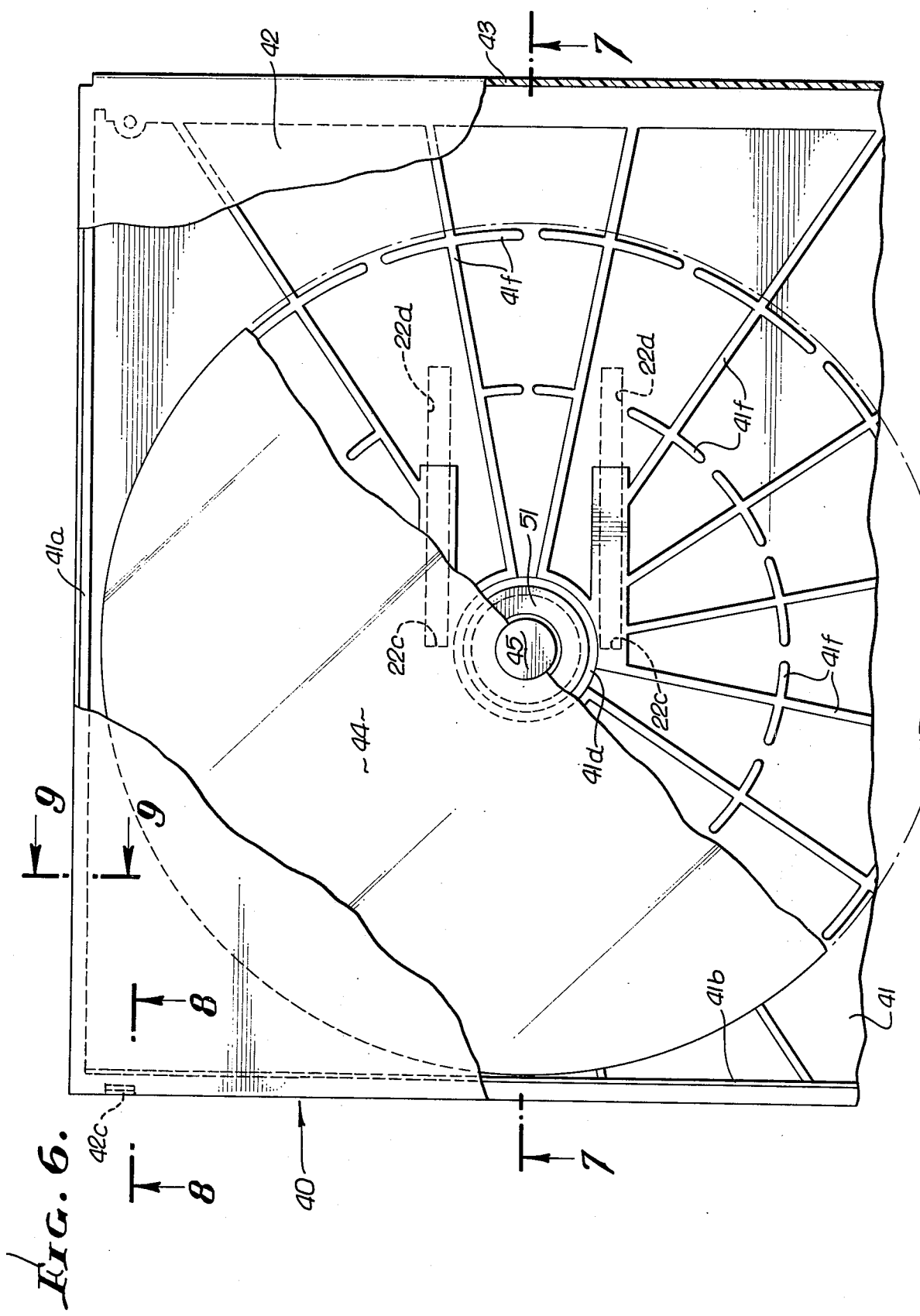

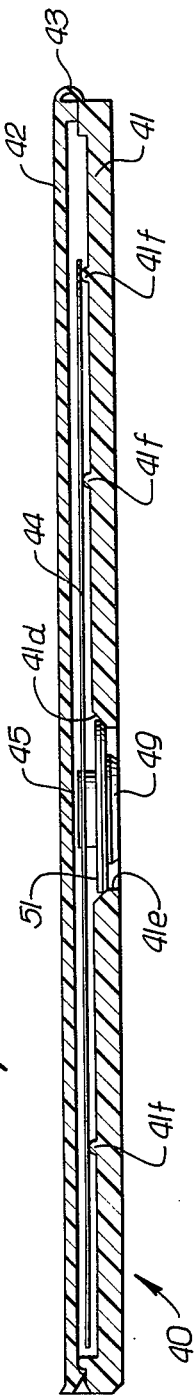
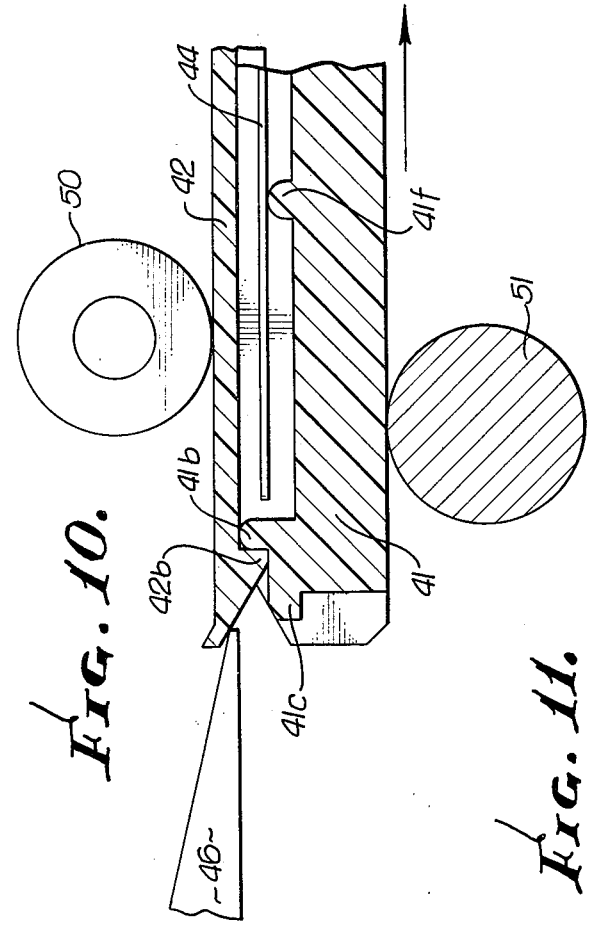
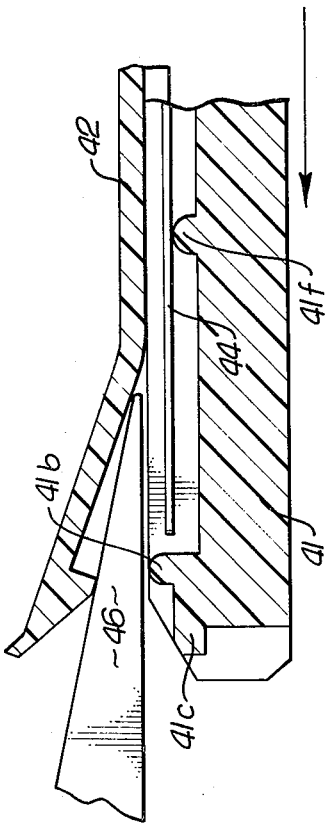
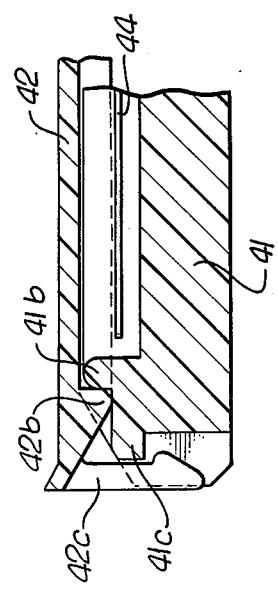
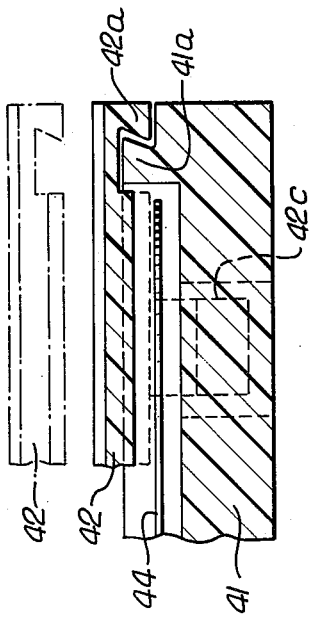

3,975,768

REMOVABLE CARTRIDGE FLEXIBLE DISC MEMORY APPARATUS

BACKGROUND OF THE INVENTION

Flexible disc or "floppy" disc memory devices, as is well known, include a head plate which carries a number of read-write magnetic transducers relative to which the flexible magnetic disc rotates. A thin film of air maintains a gap between the disc and the head plate and heads.

Such apparatus, in general, incorporates the head plate, disc, disc drive and other related operating and control structures within an integrated assembly which is expensive and of limited memory storage capacity.

The Prior Art

Examples of the prior art are:
U.S. Pat. No. 3,688,285, granted Aug. 29, 1972; and
U.S. Pat. No. 3,225,338, granted Dec. 21, 1965.

SUMMARY OF THE INVENTION

The present invention provides relatively inexpensive but efficient magnetic disc memory apparatus which enables the storage and recovery of a large memory bank contained in removable cartridges.

The invention also provides a rotatable, flexible disc magnetic memory cartridge of unique construction, which is sealed when not in use, which is opened when inserted into the read-write apparatus containing the magnetic heads and drive for the disc, and which is adapted to be reclosed when removed from the apparatus.

More particularly, the invention has as its objectives the provision of a low-cost digital storage device suitable for program load, calculator, power typing, small business machines, intelligent terminals, and mini-computer applications. The apparatus has removable or cartridge-contained memory capability, and in a specific capability is combined with fixed memory capability, that is, a flexible disc memory which is integrated into the apparatus, as distinguished from the memory cartridge.

The apparatus involves a removable cartridge containing a magnetic disc which is rotated relative to an adjustable head plate which enables a transducer head on the head plate to be moved to a number of different positions radially of the magnetic disc. The drive for the disc in the cartridges also drives the disc in the fixed memory unit, so that both discs can be controlled by common clocking and sector heads on either of the discs.

The cartridge is constructed with a flexible cover or lid which is latched to the cartridge base, the lid being progressively opened and guided past the adjustable head plate which has access to the magnetic disc throughout the entire range of adjustment of the head plate. The cartridge is reclosed as it is removed from the apparatus, and, thus, opening and closure of the cartridge is accomplished entirely within the apparatus which is housed to be substantially free of contamination. The cartridge includes a disc hub which also effectively seals with the cartridge base to maintain the cartridge interior free of contamination.

A drive coupling for the cartridge disc hub automatically centers the hub and effects the drive upon insertion of the cartridge. The drive is interrupted during insertion of the cartridge and is re-established when the cartridge is fully in place.

This invention possesses many other advantages, and has other purposes which may be made more clearly apparent from a consideration of the forms in which it may be embodied. These forms are shown in the drawings accompanying and forming part of the present specification. They will now be described in detail, for the purpose of illustrating the general principals of the invention; but it is to be understood that such detailed descriptions are not to be taken in a limiting sense, since the scope of the invention is best defined by the appended claims.

BRIEF DESCRIPTION OF THE DRAWINGS

FIG. 3 is a vertical section, as taken on the line 3—3 of FIG. 1;

FIG. 4 is a fragmentary vertical section, corresponding to FIG. 1, but showing a cartridge in place in the apparatus;

FIG. 6 is a fragmentary top plan, with parts broken away, showing a cartridge according to the invention;

FIG. 7 is a vertical section, as taken on the line 7—7 of FIG. 6;

FIG. 8 is a fragmentary vertical section, as taken on the line 8—8 of FIG. 6;

FIG. 9 is a fragmentary vertical section, as taken on the line 9—9 of FIG. 6;

FIG. 10 is a fragmentary detail section illustrating the opening of the cartridge; and FIG. 11 is a fragmentary detail section illustrating the closing of the cartridge.

DESCRIPTION OF THE PREFERRED EMBODIMENT

Figure 1:
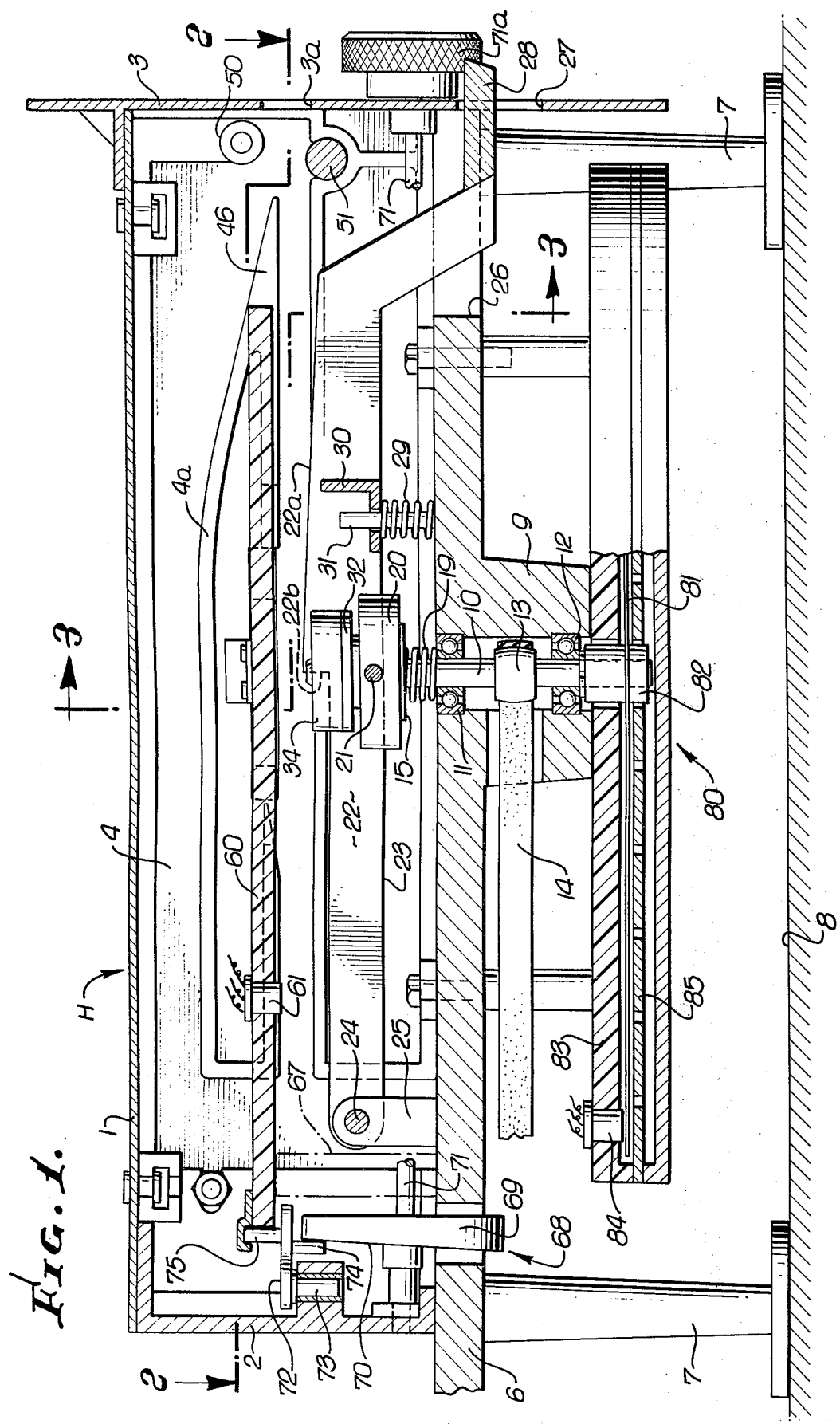
FIG. 1 is a vertical section, with certain parts shown in elevation, through apparatus made in accordance with the invention.
Figure 2:
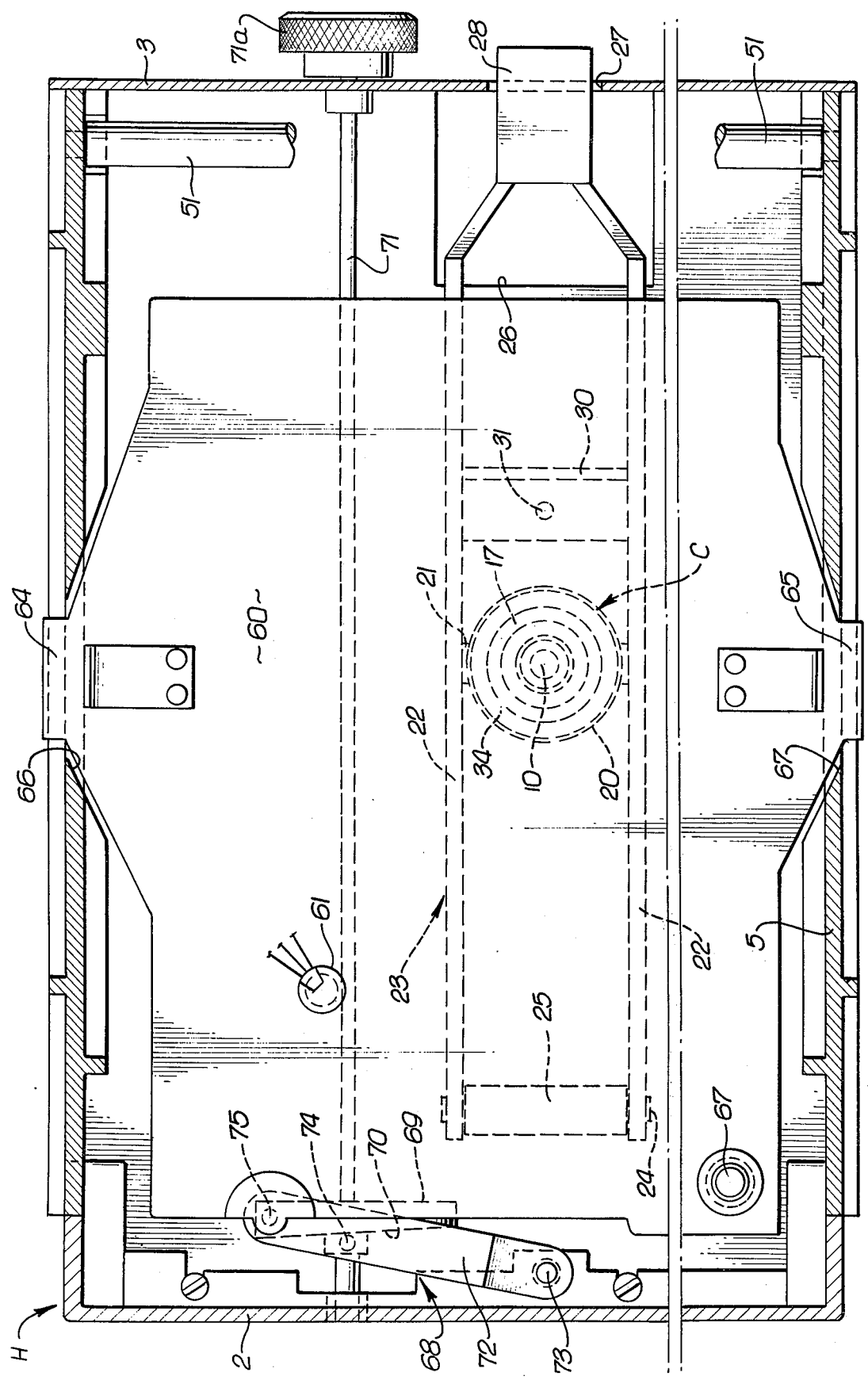
FIG. 2 is a horizontal section, as taken on the line 2—2 of FIG. 1.

As seen in the drawings, the apparatus comprises a housing H having a top wall 1, a rear wall 2, a front wall 3 and side walls 4 and 5 suitably assembled upon a base 6 adapted to be supported on legs 7 which support the base 6 in vertically spaced relation over a table 8 or the like. The base 6 has a central section 9 providing a bearing support for a rotatable shaft 10 which is journalled in suitable vertically spaced bearings 11 and 12 between which is a drive pulley 13 adapted to be driven by a suitable power source through a belt 14.

Figure 5:
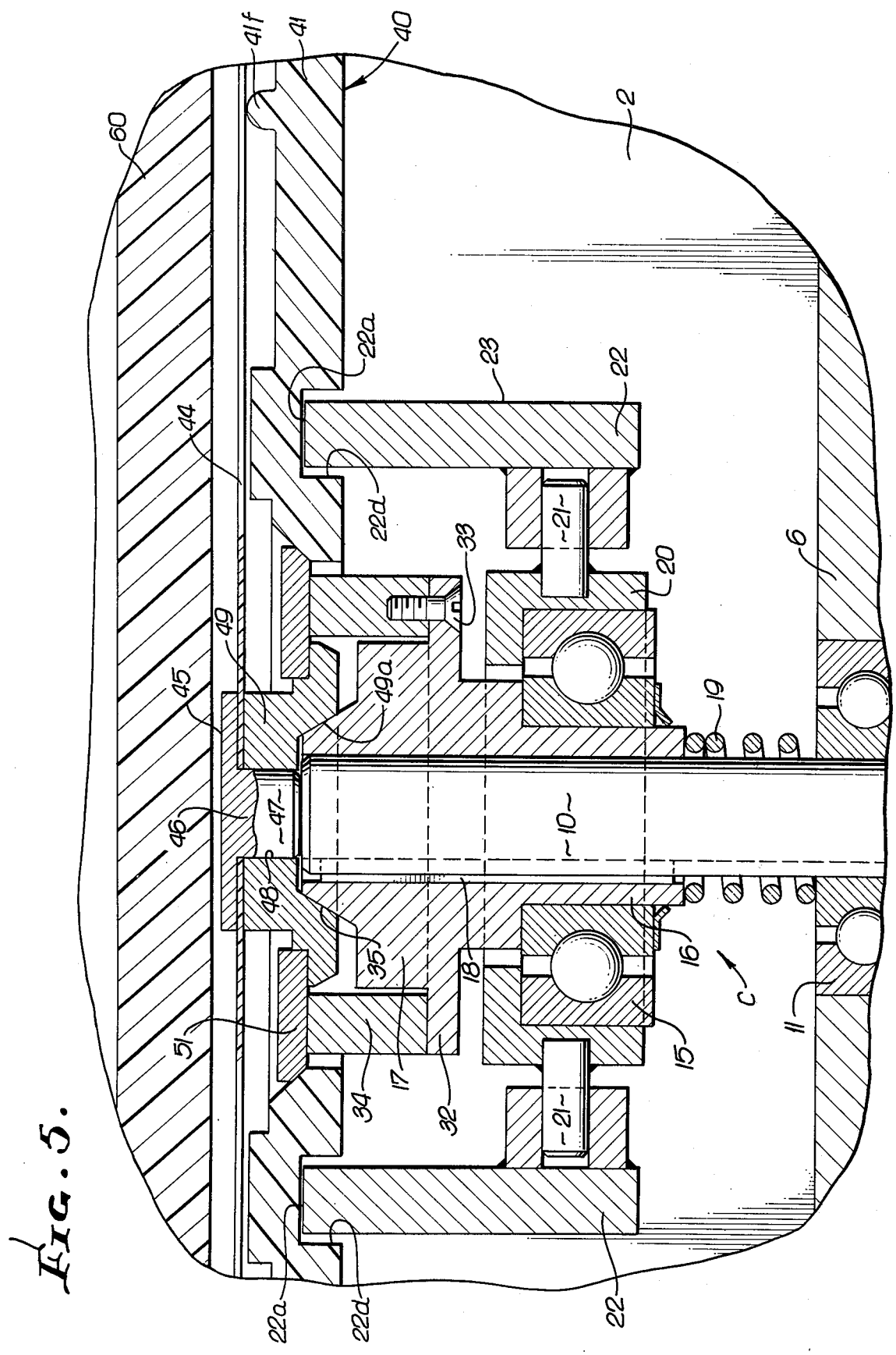
FIG. 5 is a fragmentary vertical section, as taken on the line 5—5 of FIG. 4, and on an enlarged scale.

At the upper end of the shaft 10, as best seen in FIG. 5, is a coupling or clutch assembly C including a throwout bearing assembly 15 which is retained on a skirt portion 16 of a clutch body 17 which is in turn keyed at 18 to the shaft 10 for rotation therewith. The clutch body 17 is normally biased upwardly by suitable spring means, such as a coiled compression spring 19 which is interposed between the clutch body and the shaft bearing 11. On the throwout bearing 15 is a thrust collar 20 having opposed pins 21 projecting radially therefrom and engaged with the opposite arms 22 of a clutch operating yoke or lever 23. This lever 23 is pivoted within the housing on a pivot pin 24 which is mounted in a suitable bracket 25 upstanding from the base 6. At its free end, the lever 23 extends downwardly from an opening 26 in the base 6 and thence upwardly through an opening 27 in the front wall 3 of the housing to provide a hand operable portion 28. The lever 23 is normally biased upwardly by suitable spring means such as a coil spring 29 interposed between the base 6 and transverse bracket 30 which extends between the lever arms 22, the spring being disposed about a guide pin 31.

When the lever 23 is depressed either by manual depression of the portion 28 or automatically, as will be later described, the thrust collar 20, through the throw-out bearing 15 will shift the clutch body 17 downwardly with respect to the shaft 10. For purposes which will be later more specifically described, the clutch body 17 has an upwardly extended flange 32 on which is secured by fasteners 33a ring magnet 34. At its upper end the clutch body 17 has a frustoconical projection 35 which converges upwardly.

The drive mechanism, including the clutch assembly C, is adapted to operate and be operated by a magnetic disc memory cartridge generally denoted at 40. As seen in FIGS. 4 and 5, the disc cartridge 40 has a bottom wall 41 and a complemental flexible top wall 42 which are composed of suitable plastic material and preferably hingedly connected at 43 by an integral flexible hinge which extends completely across the cartridge. The cartridge 40 contains a thin magnetic memory disc 44, which, as is well known, is composed of flexible plastic material coated with iron oxide. Thus disc 44, at its center, is provided with a hub 45 including a center piece 46 having a stem 47 adapted to be frictionally engaged in a bore 48 of a centering ring 49. This ring 49 has a conical depression 49a in its underside engageable upon the conical projection 35 of the clutch body 17 whereby the disc 44 is inherently centralized on the shaft 10 when the cartridge is inserted into the housing through a transversely elongated slot 3a in the front wall 3 of the housing H. About its outer periphery the centering ring 49 has a metal washer 51 magnetically attracted to the ring magnet 34, causing the centering ring 49 to be urged downwardly into centered engagement with the clutch body 17.

As previously indicated, the clutch mechanism C is adapted to be actuated by the cartridge, and thus the lever arms 22 between the region of the clutch assembly C and the free ends of the lever arms are provided with inclined or cam surfaces 22a which are adapted to be engaged by the under surface of the cartridge 40, as the cartridge is being inserted into the housing. The cam surfaces 22a of the lever arms 22 terminate in vertical shoulders 22b adapted to engage companion vertical shoulders 22c which are formed at the inner ends of elongated slots or notches 22d in the undersurface of the bottom 41 of the cartridge 40, these notches 22d allowing the lever arms 22 to be moved upwardly into the slots 22d when the cartridge 40 has been fully inserted, so that the clutch mechanism C will be automatically engaged as the cartridge is fully inserted. When the cartridge is to be removed from the housing the lever 23 is manually depressed by the end extension 28 to release the shoulder 22b from the end 22c of the slot 22d in the bottom of the cartridge, and this simultaneously disengages the clutch mechanism C.

As will be later described, the cartridge 40, when closed, is latched closed but is adapted to be opened upon insertion into the housing. Accordingly, on the side walls 4 and 5 of the housing are guide ribs 4a and 5a, respectively, which extend inwardly and upwardly from a wedge shaped section 4b on the wall 4 and a corresponding wedge section on the side wall 5. To close the cartridge 40 upon removal from the housing, pressure applying means are provided in the form of laterally spaced top rollers 50 and an opposed transversely extended bottom roller 51 suitably journalled in the side walls of the housing, whereby as the cartridge is removed, the rollers 50 press the side edges of the top of the cartridge into engagement with the side edges of the bottom of the cartridge, progressively as the cartridge is removed. The details of the cartridge will be later described.

Within the housing H, for cooperation with the disc 44 of the cartridge 40, when the cartridge is inserted into the housing, is a head plate 60 having a suitble number of read-write transducers 61. This head plate 60 extends horizontally between the side walls 4 and 5 below the side wall guide ribs 4a and 5a, so as to be disposed closely above the disc 44 when the cartridge is inserted. While the head plate 60 in some embodiments of the invention may be fixed in place between the side walls 4 and 5, in the embodiment illustrated, the head plate 60 is adapted to be shifted relative to the disc 44 to adjust the position of the head or heads 61 radially with respect to the disc 44. Accordingly, as shown, the head plate 60 has laterally projecting ears 64 and 65 extending through slots 66 and 67 into side walls 4 and 5 respectively, so as to slideably support the head plate 60 for pivotal movement about a pivot pin 67 which projects upwardly from the base 6 through the head board 60.

Actuator means generally denoted at 68, are provided for shifting the head board 60 about the head pin 67. In the illustrative embodiment the actuator means comprises a rotary cam 69 having a cam surface 70, the cam being mounted for rotation by a shaft 71 which extends through the front wall 3 of the housing and has a suitable actuator nob 71a. Rotation of the cam 69 effects pivotal movement of a cam follower lever 72 which is pivoted at 73 and has a cam surface engaging pin 74 projecting downwardly and engaged with the cam surface 70 and another pin 75 projecting upwardly and engaged with the head plate 60 in the region of a corner opposed to the corner at which the head plate is pivoted. Thus, as the nob 71a is rotated the cam 69 will pivot the head plate 60 to adjust the transducer head or heads 61 radially with respect to the magnetic disc 44.

In a simple form the apparatus may consist wholely of the cartridge receiving structure described above, but in the form shown, in the apparatus also includes what may be called a fixed memory means, generally denoted at 80, including rotatable magnetic memory disc 81 having a hub 82 carried by the shaft 10 for rotation in unison with the disc 44 within the cartridge 40. The fixed memory means 80 includes an upper disc or head plate 83 having a suitable number of magnetic transducers 84 cooperative with the magnetic disc 81. Beneath the disc 81 is a perforated air control or rest plate 85 over which the disc 81 flies on an air film. The fixed memory means 80 may be made in accordance with the invention disclosed in the application for United States Letters Patent filed concurrently herewith in the name of James O. Jacques, now U.S. Pat. No. 3,846,837 for "Stacked Flexible Disc Unit with Head Plugs."

The details of construction of a preferred cartridge 40 are shown in FIGS. 6–11. Means are provided along the side edges of the cartridge extending from the hinge section 43 to the front of the cartridge, which interlock to hold the cartridge securely closed when it is outside of the apparatus. As seen in FIG. 9 such means comprise integral and complemental ribs 41a on the cartridge bottom and 42a on the cartridge top which have angularly disposed confronting faces which project into lapped relation to one another. As the cartridge is being opened, as previously described, by the wedge elements 46, the ribs 41a and 42a are progressively wedged apart, the resiliency of the plastic material enabling the necessary relative deflection. Along the front edge of the cartridge 40, the bottom 41 has an upstanding rib 41b extending thereacross adapted to be engaged within a depending rib 42b extending along the cartridge top 42. At spaced locations, at the front of the cartridge 40, as seen in FIG. 8, the cartridge top and bottom have cooperative latch means comprising a lug 41c on the bottom 41 and resilient latch finger 42c on the cover 42 which can be resiliently deflected upon closure of the cartridge.

As seen in FIG. 7, the washer 51 which forms a part of the hub structure for the magnetic disc 44 is adapted to sealingly engage a bevelled annular surface 41d which surrounds the opening 41e on the bottom of the cartridge, so that when the cartridge is not in use, and is stored in a horizontal position the opening is effectively sealed to prevent contamination of the interior of the cartridge.

In order to assist in causing the disc 44 to fly within the apparatus on an air film between the bottom 41 of the cartridge and the head plate 60, the inside surface of the bottom 41 has ribbing denoted at 41f. This ribbing consists of radially extended and circumferentially spaced ribs and circumferentially extended rib segments disposed on diameters approximately at the midsection of the disc radius and approximately at the outer periphery of the disc 44.

We claim as our invention:

1. In flexible magnetic disc memory apparatus adapted to receive a flexible disc cartridge having a bottom, a top hinged at the rear of the bottom and a flexible magnetic disc with a hub disposed in an opening in the bottom of the cartridge, said apparatus comprising: a housing having an opening to receive said cartridge, a drive shaft extending into said housing, means for rotating said shaft, coupling means rotatable by said shaft and engageable with the hub of said disc upon insertion of said cartridge into said housing to rotate said disc, a transducer head plate in said housing, and means for opening said cartridge upon insertion of said cartridge into said housing to allow the top and bottom of said cartridge to span said head plate, said opening means including wedge means on opposite side walls of said housing and guide means on said side walls for moving the top of said cartridge away from the bottom of said cartridge, whereby said head plate is disposed between said top and bottom of said cartridge.

2. In flexible magnetic disc memory apparatus as defined in claim 1, including another transducer head plate carried by said housing, and another flexible magnetic disc carried by said shaft adjacent to said another head plate.

3. In flexible magnetic disc memory apparatus as defined in claim 1, said coupling means including a magnetic drive ring rotated by said shaft.

4. In flexible magnetic disc memory apparatus as defined in claim 1, said coupling means including a magnetic drive ring rotated by said shaft, throwout means mounting said drive ring for movement longitudinally of said shaft between a drive position and a non-drive position, and means for actuating said throwout means upon insertion of said cartridge into said housing to initially move said drive ring to said non-drive position and then to said drive position.

5. In flexible magnetic disc memory apparatus as defined in claim 1, said coupling means including a magnetic drive ring rotated by said shaft, throwout means mounting said drive ring for movement longitudinally of said shaft between a drive position and a non-drive position, and means for actuating said throwout means upon insertion of said cartridge into said housing to initially move said drive ring to said non-drive position and then to said drive position, said means for actuating said throwout means including a throwout lever disposed in the path of the cartridge as said cartridge is inserted into said housing and a spring normally biasing said drive ring to said drive position.

6. In flexible magnetic disc memory apparatus as defined in claim 1, said coupling means including a magnetic drive ring rotated by said shaft, throwout means mounting said drive ring for movement longitudinally of said shaft between a drive position and a non-drive position, and means for actuating said throwout means upon insertion of said cartridge into said housing to initially move said drive ring to said non-drive position and then to said drive position, said means for actuating said throwout means including a throwout lever disposed in the path of the cartridge as said cartridge is inserted into said housing and a spring normally biasing said drive ring to said drive position, said lever having means engageable with said cartridge when said cartridge is in said drive position to hold said cartridge in said housing until said drive ring is in said non-drive position.

7. In flexible magnetic disc memory apparatus as defined in claim 1, means for reclosing said cartridge when said cartridge is removed from said housing.

8. In flexible magnetic disc memory apparatus as defined in claim 1, said means for opening said cartridge including wedge means on opposite side walls of said housing.

9. In flexible magnetic disc memory apparatus as defined in claim 1, means mounting said head plate for radial adjustment relative to the disc of said cartridge, and means for actuating said head plate to adjusted positions including a cam, a cam shaft extending from said housing, and operating means for said cam shaft externally of said housing.

10. In flexible magnetic disc memory apparatus as defined in claim 1, said means for opening said cartridge including wedge means on opposite side walls of said housing, and also including means for closing said cartridge when said cartridge is removed from said housing.

11. In flexible magnetic disc memory apparatus as defined in claim 1, means mounting said head plate for radial adjustment relative to the disc of said cartridge.

12. In flexible magnetic disc memory apparatus as defined in claim 1, means mounting said head plate for radial adjustment relative to the disc of said cartridge including a pivot for said head plate and means slidably supporting said head plate in said housing.

13. In flexible magnetic disc memory apparatus as defined in claim 1, means mounting said head plate for radial adjustment relative to the disc of said cartridge, and means for actuating said head plate to adjusted positions.

14. In flexible magnetic disc memory apparatus; a cartridge and a cartridge receiving unit, said cartridge including top and bottom walls hinged across a rear wall, a flexible magnetic disc in said cartridge having a hub, the bottom of said cartridge having an opening for said hub; said cartridge receiving unit comprising: a housing having an opening to receive said cartridge, a drive shaft extending into said housing, means for rotating said shaft, coupling means rotatable by said shaft and engageable with the hub of said disc upon insertion of said cartridge into said housing to allow the top and bottom of said cartridge to span said head plate and wedge means on opposite side walls of said housing and guide means on said side walls for moving the top of said cartridge away from the bottom of said cartridge, whereby said head plate is disposed between said top and bottom of said cartridge.

15. In flexible magnetic disc memory apparatus as defined in claim 14, additional memory means including another transducer head plate carried by said housing, and another flexible magnetic disc carried by said shaft adjacent to said another head plate.

16. In flexible magnetic disc memory apparatus as defined in claim 14, said coupling means including a magnetic drive ring rotated by said shaft and a magnetic ring on said hub.

17. In flexible magnetic disc memory apparatus as defined in claim 14, said coupling means and said hub having means for centering said hub with respect to said shaft.

18. In flexible magnetic disc memory apparatus as defined in claim 14, means for reclosing said cartridge when said cartridge is removed from said housing.

19. In flexible magnetic disc memory apparatus as defined in claim 14, means for reclosing said cartridge when said cartridge is removed from said housing, said cartridge having latch means for holding the cartridge closed upon removal from said unit.

20. In flexible magnetic disc memory apparatus as defined in claim 14, means for reclosing said cartridge when said cartridge is removed from said housing, said cartridge having latch means for holding the cartridge closed upon removal from said unit, and means forming a seal about the sides of said cartridge when it is closed.

21. In flexible magnetic disc memory apparatus as defined in claim 14, means for reclosing said cartridge when said cartridge is removed from said housing, said cartridge having latch means for holding the cartridge closed upon removal from said unit, and means forming a seal about the sides of said cartridge when it is closed, said hub having sealing means engageable with the cartridge about said hub opening.

* * * * *